United States Patent

Sugimura et al.

(10) Patent No.: US 11,313,686 B2
(45) Date of Patent: Apr. 26, 2022

(54) MOVING BODY

(71) Applicant: TOYOTA JIDOSHA KABUSHIKI KAISHA, Toyota (JP)

(72) Inventors: Tae Sugimura, Miyoshi (JP); Hirotaka Karube, Toyota (JP); Kazuki Matsumoto, Ohgaki (JP); Makoto Mori, Nagakute (JP); Jun Kondo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 16/516,975

(22) Filed: Jul. 19, 2019

(65) Prior Publication Data

US 2020/0116507 A1     Apr. 16, 2020

(30) Foreign Application Priority Data

Oct. 16, 2018  (JP) ............................. JP2018-194931

(51) Int. Cl.
| | | |
|---|---|---|
| *G01C 21/34* | (2006.01) | |
| *G06K 9/62* | (2022.01) | |
| *G06V 10/60* | (2022.01) | |
| *G06V 20/56* | (2022.01) | |

(52) U.S. Cl.
CPC ..... *G01C 21/3407* (2013.01); *G01C 21/3461* (2013.01); *G06K 9/6261* (2013.01); *G06V 10/60* (2022.01); *G06V 20/588* (2022.01)

(58) Field of Classification Search
CPC ............ G01C 21/3407; G01C 21/3461; G06K 9/00798; G06K 9/4661; G06K 9/6261
USPC ...................................................... 701/423
See application file for complete search history.

(56) References Cited

U.S. PATENT DOCUMENTS

| | | | |
|---|---|---|---|
| 6,470,267 B1 | | 10/2002 | Nozaki |
| 2004/0138831 A1 | * | 7/2004 | Watanabe ............. B60T 8/1725 702/33 |
| 2019/0137290 A1 | * | 5/2019 | Levy ....................... B60Q 1/50 |

FOREIGN PATENT DOCUMENTS

| | | | |
|---|---|---|---|
| CN | 106127768 | * | 11/2016 |
| JP | 2000-353295 A | | 12/2000 |
| JP | 2001-091292 A | | 4/2001 |
| JP | 2004-058994 A | | 2/2004 |
| JP | 2004-226199 A | | 8/2004 |
| JP | 2004226199 | * | 8/2004 |
| JP | 2012-230067 A | | 11/2012 |
| KR | 101269733 | * | 5/2013 |
| KR | 101269733 B1 | * | 5/2013 |

OTHER PUBLICATIONS

Jordan Golson, "Well, That Didn't Work: The Segway is a Technological Marvel, Too Bad It Doesn't Make Any Sense", Jan. 16, 2015, WIRED (Year: 2015).*

* cited by examiner

*Primary Examiner* — Russell Frejd
*Assistant Examiner* — Matthias S Weisfeld
(74) *Attorney, Agent, or Firm* — Oliff PLC

(57) ABSTRACT

A moving body, which a person boards, includes an acquisition unit configured to acquire current position information of the moving body, and a recommended path calculation unit configured to calculate a path that is a recommended path toward a predetermined destination and passes through an interior of at least one building, based on the current position information and the predetermined destination.

6 Claims, 7 Drawing Sheets

MOVING BODY

INCORPORATION BY REFERENCE

The disclosure of Japanese Patent Application No. 2018-194931 filed on Oct. 16, 2018 including the specification, drawings and abstract is incorporated herein by reference in its entirety.

BACKGROUND

1. Technical Field

The disclosure relates to a moving body.

2. Description of Related Art

In a case of moving to a destination by using a vehicle, there is a need to desire to move away from sunlight for comfort. For example, Japanese Unexamined Patent Application Publication No. 2004-226199 (JP 2004-226199 A) discloses a navigation device that is provided with path searching means configured to be able to search for a path in consideration of the degree of sunshine. The navigation device performs scoring of whether or not it is easy for each road to be shaded, based on surrounding conditions, seasons, time zones, or the like, and then calculates a recommended path, based on the scoring.

SUMMARY

However, the navigation device disclosed in JP 2004-226199 A is intended for solely a vehicle passing on a road. For this reason, there is a possibility that the navigation device is not able to recommend an optimal path for a vehicle that is small enough to travel in a building.

The disclosure provides a moving body that makes it possible to accurately travel on a path with a low sunshine degree, which includes the interior of a building.

A first aspect of the disclosure relates to a moving body which a person boards. The moving body includes an acquisition unit configured to acquire current position information of the moving body, and a recommended path calculation unit configured to calculate a path that is a recommended path toward a predetermined destination and passes through an interior of at least one building, based on the current position information and the predetermined destination.

According to the first aspect of the disclosure, the path passing through the interior of at least one building is calculated, and therefore, it becomes possible to accurately travel on a path with a low sunshine degree.

The moving body according to the first aspect of the disclosure may further include an imaging unit configured to generate an image by imaging a road surface, a sunshine degree distribution calculation unit configured to calculate a sunshine degree distribution of the road surface, based on the image, a recommended course calculation unit configured to calculate a recommended course in which traveling is recommended within one path, based on the sunshine degree distribution, and a recommended course notification unit configured to give notice of the recommended course.

In the moving body according to the first aspect of the disclosure, the sunshine degree distribution calculation unit may include a road surface area specifying unit configured to specify a road surface area included in the image, a road surface area division unit configured to divide the road surface area into a plurality of small areas, and a sunshine degree calculation unit configured to calculate a sunshine degree with respect to each of the small areas.

In the moving body according to the first aspect of the disclosure, the recommended course calculation unit may include a candidate course calculation unit configured to calculate at least one candidate course connecting a current point to a destination point included in the image, a total sunshine degree calculation unit configured to calculate a total sunshine degree that is a total of sunshine degrees of the small areas through which the candidate course passes, with respect to each of the at least one candidate course, and a recommended course selection unit configured to select the recommended course from the at least one candidate course, based on the total sunshine degree.

A second aspect of the disclosure relates to a moving body including circuitry. The circuitry is configured to acquire position information of the moving body, calculate a path that is a path toward a destination of the moving body and passes through an interior of at least one building in at least a part of the path, based on position information of the moving body and the destination of the moving body, and output the path.

The moving body according to the second aspect of the disclosure may further include an imaging device configured to generate an image by imaging a road surface. The circuitry may be configured to calculate a sunshine degree distribution of the road surface, based on the image, and calculate the path, based on the sunshine degree distribution.

In the moving body according to the second aspect of the disclosure, the circuitry may be configured to specify a road surface area that is included in the image, divide the road surface area into a plurality of small areas, and calculate a sunshine degree with respect to each of the small areas.

In the moving body according to the second aspect of the disclosure, the circuitry may be configured to calculate at least one candidate path connecting a current point to a destination point included in the image, calculate a total sunshine degree that is a total of sunshine degrees of the small areas through which the candidate path passes, with respect to each of the at least one candidate path, and select a recommended path from the at least one candidate path, based on the total sunshine degree.

According to each aspect of the disclosure, it is possible to provide a moving body that makes it possible to accurately travel on a path with a low sunshine degree, which includes the interior of a building.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
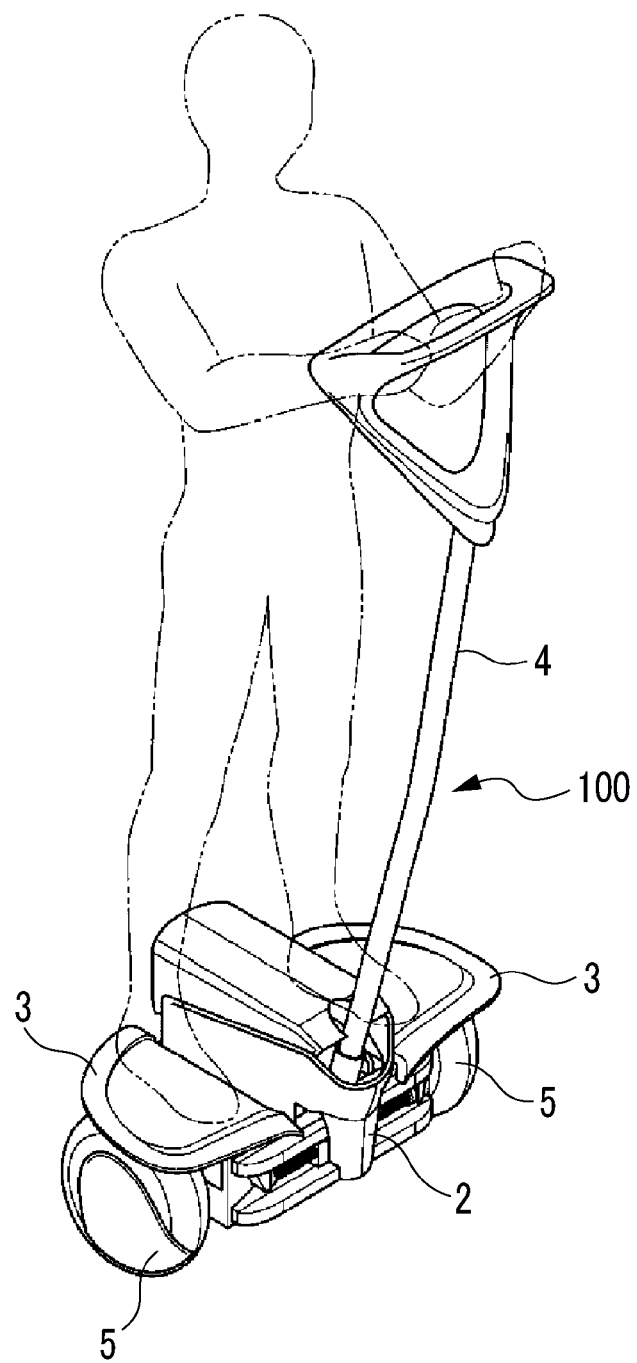
FIG. 1 is a perspective view showing a schematic configuration of a small vehicle according to an embodiment of the disclosure.

The preferred embodiment of the disclosure will be described with reference to the accompanying drawings. In each drawing, the same or similar compositions are denoted by the same reference numerals.

(1) Configuration

FIG. 1 is a perspective view showing a schematic configuration of a small vehicle 100 according to an embodiment of the disclosure.

The small vehicle 100 according to the embodiment of the disclosure is an example of a moving body and includes, for example, a vehicle main body 2, a pair of right and left step parts 3 that is mounted to the vehicle main body 2 and on which a rider steps, an operating handle 4 that is tiltably mounted to the vehicle main body 2 and gripped by the rider, and a pair of right and left drive wheels 5 rotatably mounted to the vehicle main body 2. The dimensions of the small vehicle 100 are not particularly limited. However, for example, it is desirable to be small enough to be able to travel in the interior of a building after entering the building.

The small vehicle 100 according to the embodiment of the disclosure is configured, for example, as a coaxial two-wheeled vehicle in which the respective drive wheels 5 are coaxially disposed, and which travels while an inverted state is maintained, and is also called an inverted moving body. The small vehicle 100 is configured to move forward and backward by moving the center of gravity of the rider back and forth and tilting each step part 3 of the vehicle main body 2 back and forth, and to perform right-left turning by moving the center of gravity of the rider right and left and tilting the step parts 3 of the vehicle main body 2 right and left. As the small vehicle 100, the coaxial two-wheeled vehicle as described above is applied. However, there is no limitation thereto, and any moving body that travels while an inverted state is maintained can be applied.

Figure 2:
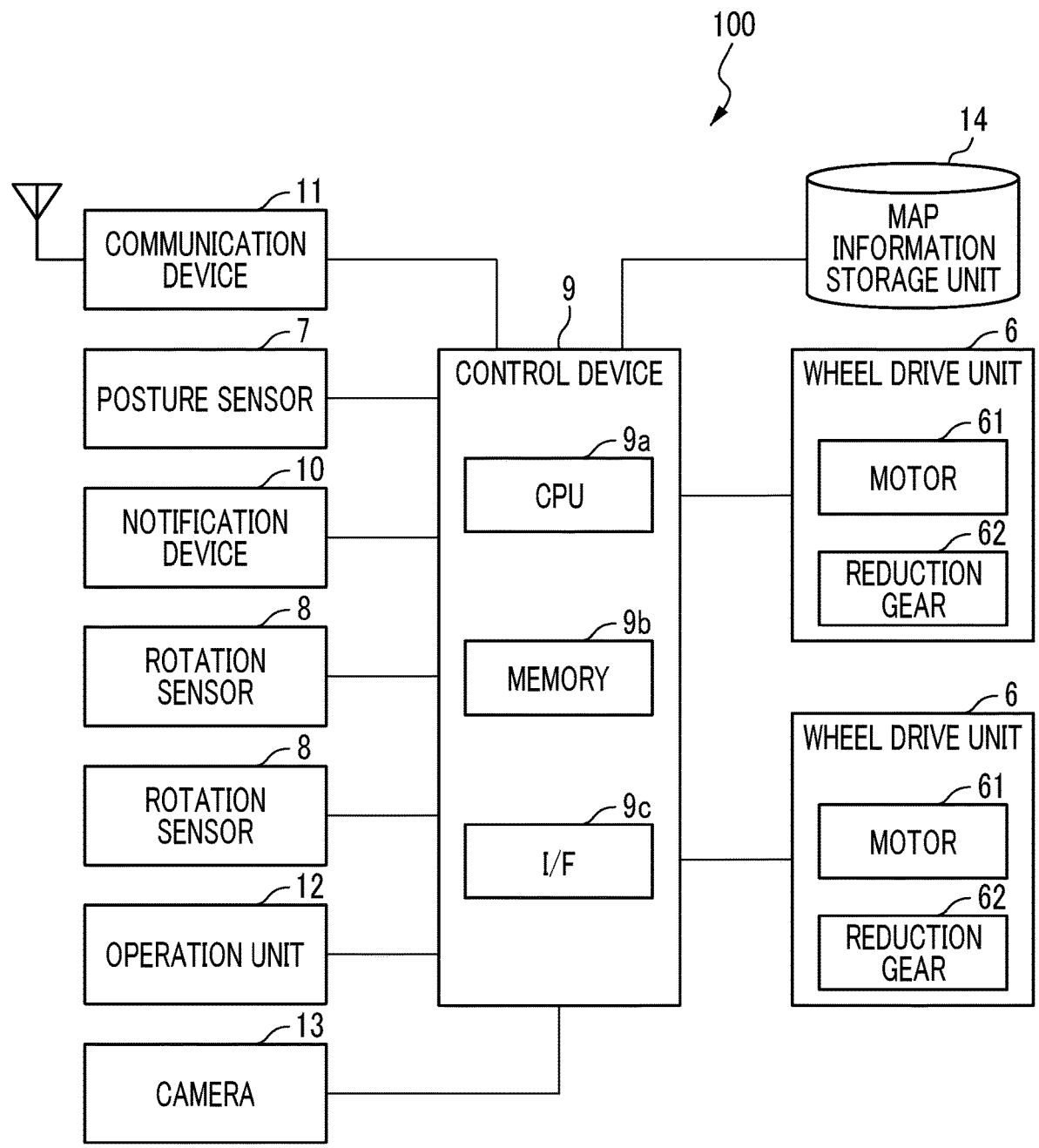
FIG. 2 is a block diagram showing a schematic system configuration of the small vehicle according to the embodiment of the disclosure.

FIG. 2 is a block diagram showing a schematic system configuration of the small vehicle 100 according to the embodiment of the disclosure.

The small vehicle 100 according to the embodiment of the disclosure includes a pair of wheel drive units 6 for driving the respective drive wheels 5, a posture sensor 7 for detecting a posture of the vehicle main body 2, and a pair of rotation sensors 8 for detecting rotation information of the respective drive wheels 5, and a control device 9 for controlling each of the wheel drive units 6.

The respective wheel drive units 6 are built in the vehicle main body 2 and drive the right and left drive wheels 5, respectively. The respective wheel drive units 6 can independently rotationally drive the drive wheels 5. Each of the wheel drive units 6 can be configured to include, for example, a motor 61 and a reduction gear 62 connected to a rotary shaft of the motor 61 so as to be able to transmit power.

The posture sensor 7 is provided in the vehicle main body 2 and detects and outputs posture information of the vehicle main body 2, the operating handle 4, or the like. The posture sensor 7 detects posture information when the small vehicle 100 is traveling, and is configured to include, for example, a gyro sensor, an acceleration sensor, or the like. When the rider tilts the operating handle 4 forward or backward, each step part 3 tilts in the same direction, and the posture sensor 7 detects posture information corresponding to such an inclination. The posture sensor 7 outputs the detected posture information to the control device 9.

Each of the rotation sensors 8 is provided at each of the drive wheels 5 or the like and can detect rotation information such as a rotation angle, rotation angular velocity, or rotation angular acceleration of each of the drive wheels 5. Each of the rotation sensors 8 is configured to include, for example, a rotary encoder, a resolver, or the like. Each of the rotation sensors 8 outputs the detected rotation information to the control device 9.

The control device 9 generates and outputs a control signal for controlling driving of each of the wheel drive units 6, based on detection values that are output from various sensors mounted on the small vehicle 100. The control device 9 executes predetermined arithmetic processing, based on, for example, posture information that is output from the posture sensor 7, rotation information of each drive wheel 5, which is output from each rotation sensor 8, and the like, and outputs a needed control signal to each wheel drive unit 6. The control device 9 controls each wheel drive units 6 to execute, for example, an inversion control for maintaining the inverted state of the small vehicle 100.

The control device 9 is configured to include hardware centered on a microcomputer that includes, for example, a central processing unit (CPU) 9a that performs control processing, arithmetic processing, and the like, a memory 9b composed of a read only memory (ROM) or a random access memory (RAM) in which a control program, an arithmetic operation program, and the like that are executed by the CPU 9a are stored, an interface unit (I/F) 9c that performs input and output of a signal from and to the outside, and the like. The CPU 9a, the memory 9b, and the interface unit 9c are mutually connected through a data bus or the like. The program of this embodiment may be provided in a state of being stored in a computer readable storage medium. The storage medium can store the program in a "non-transitory tangible medium". The program includes, for example, a software program or a computer program.

A notification device 10 is a specific example of notification means. The notification device 10 gives notice to the rider according to a notification signal from the control device 9. The notification device 10 is configured to include, for example, a speaker that outputs sound, a light that lights or blinks a warning lamp, a vibration device that vibrates the vehicle main body 2, the operating handle 4, or the like, a display that performs warning display, and the like.

A communication device 11 is configured to include a communication circuit or the like for performing communication according to a predetermined communication standard with a server device or a global positioning system (GPS) satellite. The communication device 11 includes, for example, a transmission circuit that transmits radio waves through an antenna, a reception circuit that receives radio waves through the antenna, and a switching circuit that switches a circuit connected to the antenna between the transmission circuit and the reception circuit. The communication device 11 acquires position information of the small vehicle 100 from, for example, the GPS satellite.

An operation unit 12 is an interface for allowing the rider of the small vehicle 100 to input information. The operation unit 12 includes operation buttons, a touch panel, or the like for allowing the rider to perform an input operation. When the rider performs an operation, the operation unit 12 supplies a signal corresponding to the operation to the control device 9.

A camera 13 is an example of an imaging unit and is configured to include, for example, a charge coupled device (CCD) camera. The camera 13 generates an image by imaging a road surface and supplies the generated image to the control device 9. The camera 13 is provided in the small vehicle 100 at an angle at which it is possible to image a road surface while the small vehicle 100 is traveling.

A map information storage unit 14 stores map information. The map information includes, for example, information on roads, sidewalks, other places where traffic (widely includes traffic by any vehicle or traffic by walking) is possible, or the interior of a building.

Figure 3:
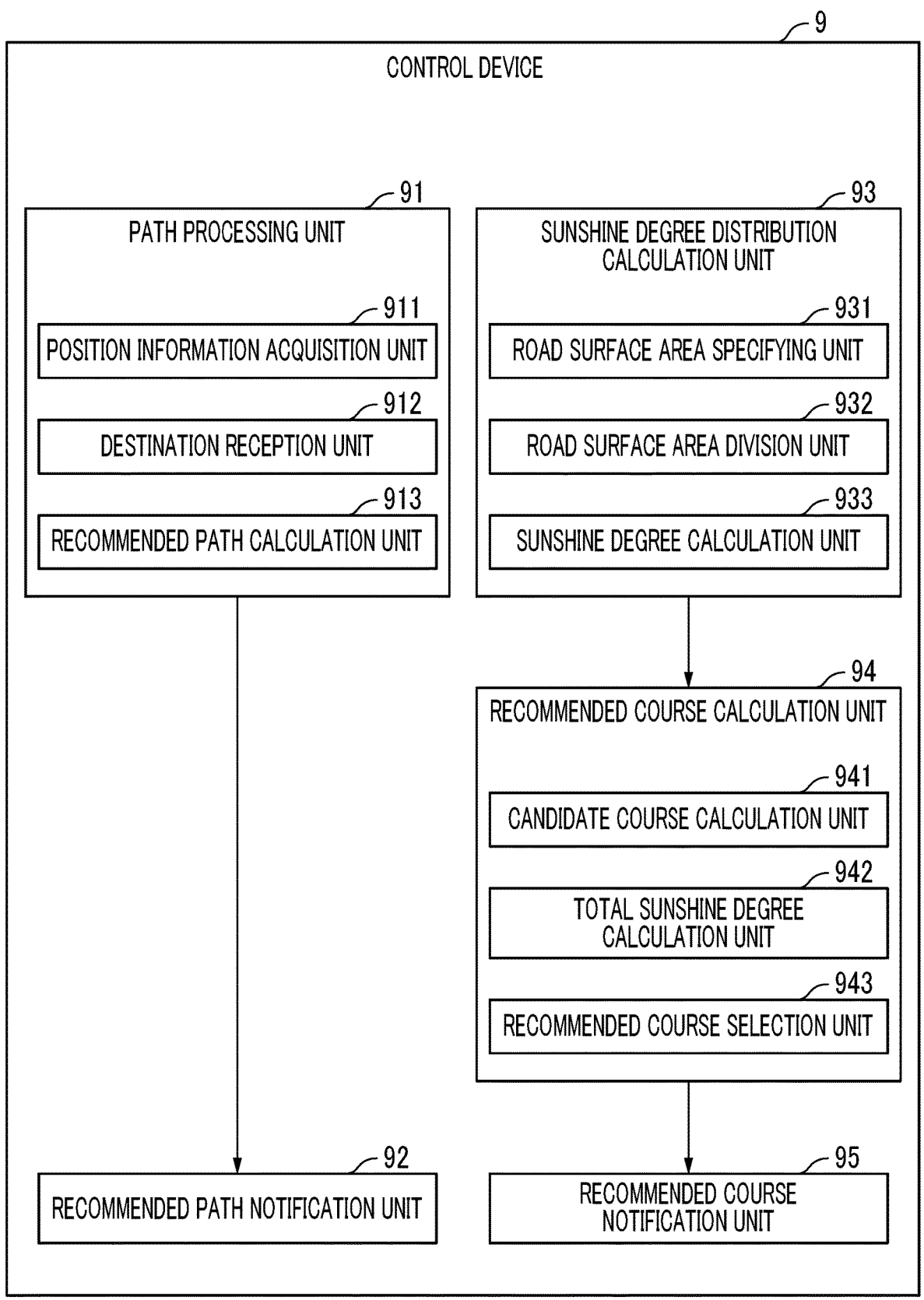
FIG. 3 is a diagram showing schematic configurations of functional modules of a control device provided in the small vehicle according to the embodiment of the disclosure.

FIG. 3 is a diagram showing schematic configurations of functional modules of the control device 9 provided in the small vehicle 100 according to the embodiment of the disclosure.

The control device 9 includes, for example, a path processing unit 91, a recommended path notification unit 92, a sunshine degree distribution calculation unit 93, a recommended course calculation unit 94, and a recommended course notification unit 95. Here, the "path" shall mean a traveling path in a road or building unit, and the "course" shall mean a traveling path (traveling position) in one path. The recommended path is calculated by the path processing unit 91 and then notified by the recommended path notification unit 92. Further, the recommended course is calculated by the cooperation of the sunshine degree distribution calculation unit 93 and the recommended course calculation unit 94 and then notified by the recommended course notification unit 95.

The path processing unit 91 includes, for example, a position information acquisition unit 911, a destination reception unit 912, and a recommended path calculation unit 913. The position information acquisition unit 911 acquires current position information of the small vehicle 100 through the communication device 11. The destination reception unit 912 receives an input of a destination according to, for example, an operation of the operation unit 12 by the rider. The recommended path calculation unit 913 refers to the map information stored in the map information storage unit 14, and calculates at least one path toward the destination from a current position as the recommended path, based on the acquired current position information of the small vehicle 100 and the received destination. The recommended path notification unit 92 gives notice of the calculated recommended path through the notification device 10.

The sunshine degree distribution calculation unit 93 includes, for example, a road surface area specifying unit 931, a road surface area division unit 932, and a sunshine degree calculation unit 933, and calculates a sunshine degree distribution of a road surface, based on the image generated by the camera 13. A method of calculating the sunshine degree distribution will be described later. The recommended course calculation unit 94 includes, for example, a candidate course calculation unit 941, a total sunshine degree calculation unit 942, and a recommended course selection unit 943, and calculates a recommended course in which traveling is recommended, based on the sunshine degree distribution. A method of calculating the recommended course will be described later. The recommended course notification unit 95 gives notice of the recommended course through the notification device 10.

(2) Recommended Path Notification Processing

Figure 4:
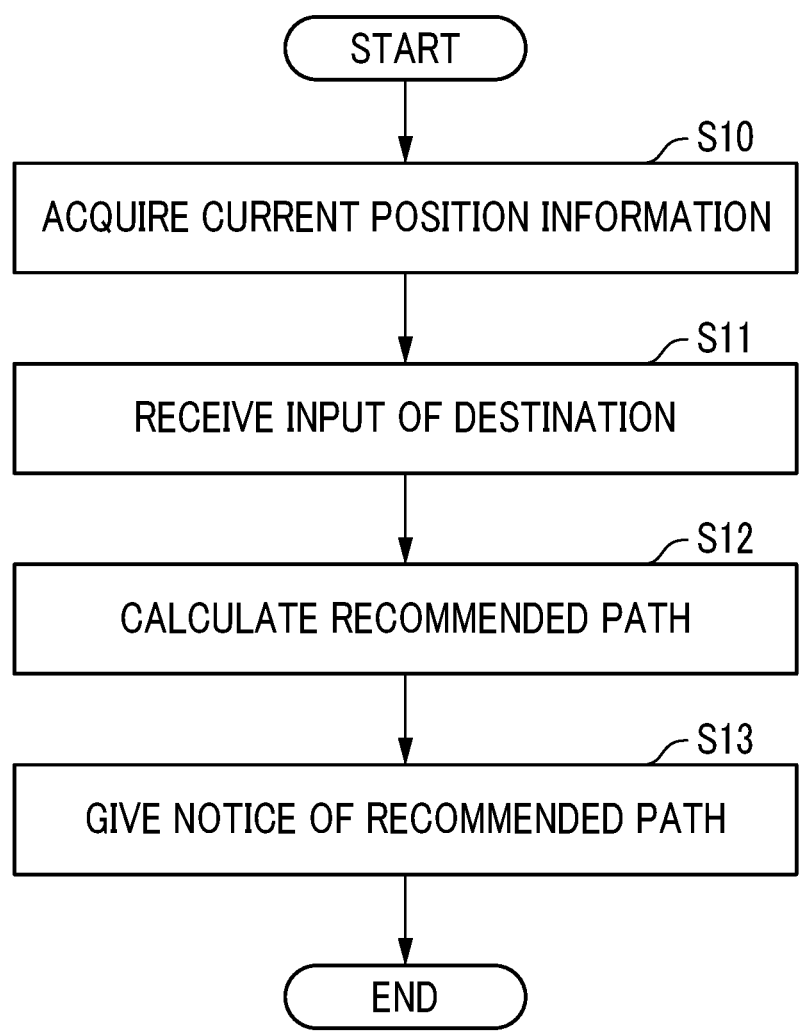
FIG. 4 is a diagram showing an example of an operation flow of recommended path notification processing of the small vehicle according to the embodiment of the disclosure.

FIG. 4 is a diagram showing an example of an operation flow of recommended path notification processing of the small vehicle 100 according to the embodiment of the disclosure. The recommended path notification processing is processing of calculating and giving notice of at least one path toward a predetermined destination from the current position of the small vehicle 100, as described in detail below.

(Step S10)

First, the position information acquisition unit 911 of the path processing unit 91 acquires current position information of the small vehicle 100 from, for example, a GPS satellite through the communication device 11.

(Step S11)

Next, the destination reception unit 912 of the path processing unit 91 receives an input of a destination according to, for example, the operation of the operation unit 12 by the rider.

(Step S12)

Next, the recommended path calculation unit 913 of the path processing unit 91 refers to the map information stored in the map information storage unit 14, and calculates at least one path toward the destination from a current position as the recommended path, based on the acquired current position information of the small vehicle 100 and the received destination.

(Step S13)

Next, the recommended path notification unit 92 of the path processing unit 91 gives notice of the calculated recommended path through the notification device 10. At this time, a sound indicating the position of the recommended path may be output so as to guide the rider to the recommended path, or the recommended path may be displayed on the display. With the above, the operation flow of the small vehicle 100 is ended.

Figure 5:
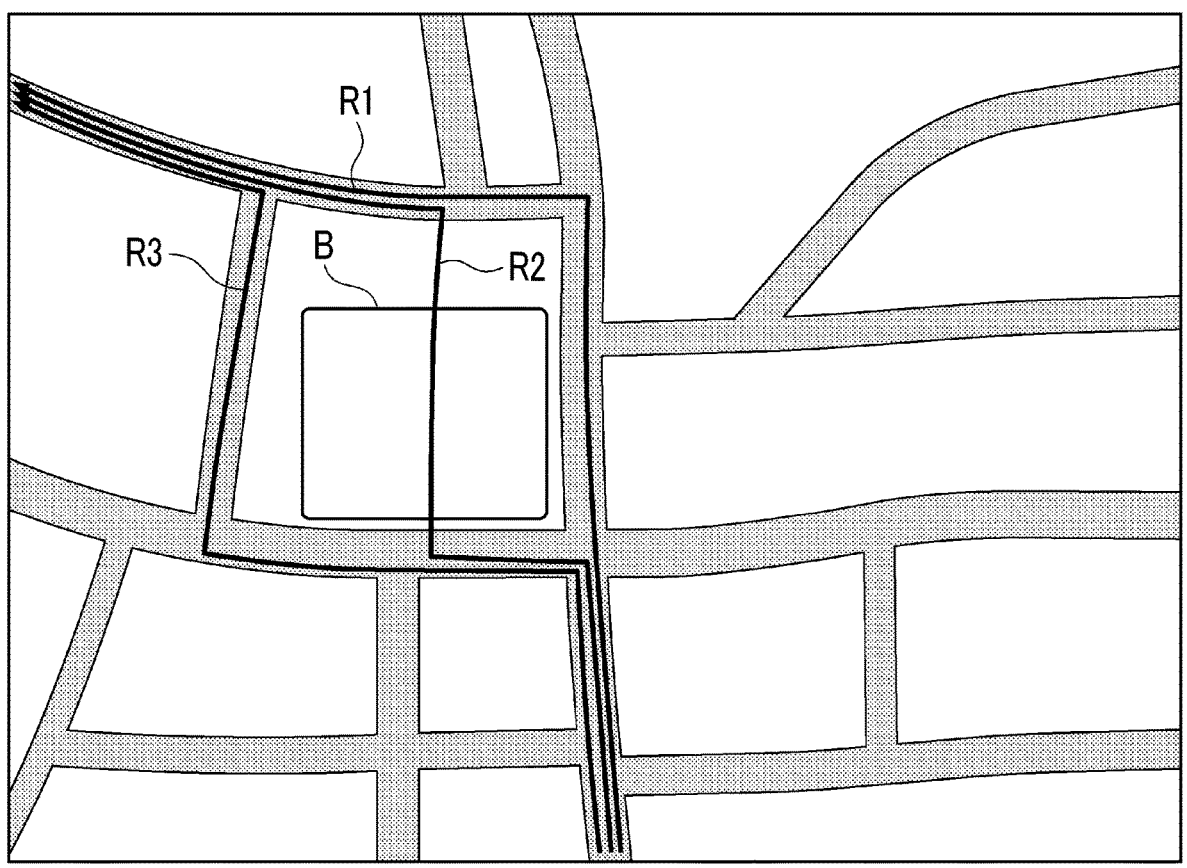
FIG. 5 is a diagram showing an example of a recommended path of which the small vehicle according to the embodiment of the disclosure gives notice.

FIG. 5 is a diagram showing an example of a recommended path of which the small vehicle 100 according to the embodiment of the disclosure gives notice. Symbols R1, R2, R3 shown in FIG. 5 indicate recommended paths, respectively. In particular, the recommended path R2 is a path that passes through the interior of a building B, as shown in FIG. 5. In this manner, the small vehicle 100 calculates and gives notice of a recommended path that passes through the interior of at least one building, as a recommended path, and therefore, it becomes possible to accurately select and travel on a path with a low sunshine degree.

(3) Recommended Course Notification Processing

Figure 6:
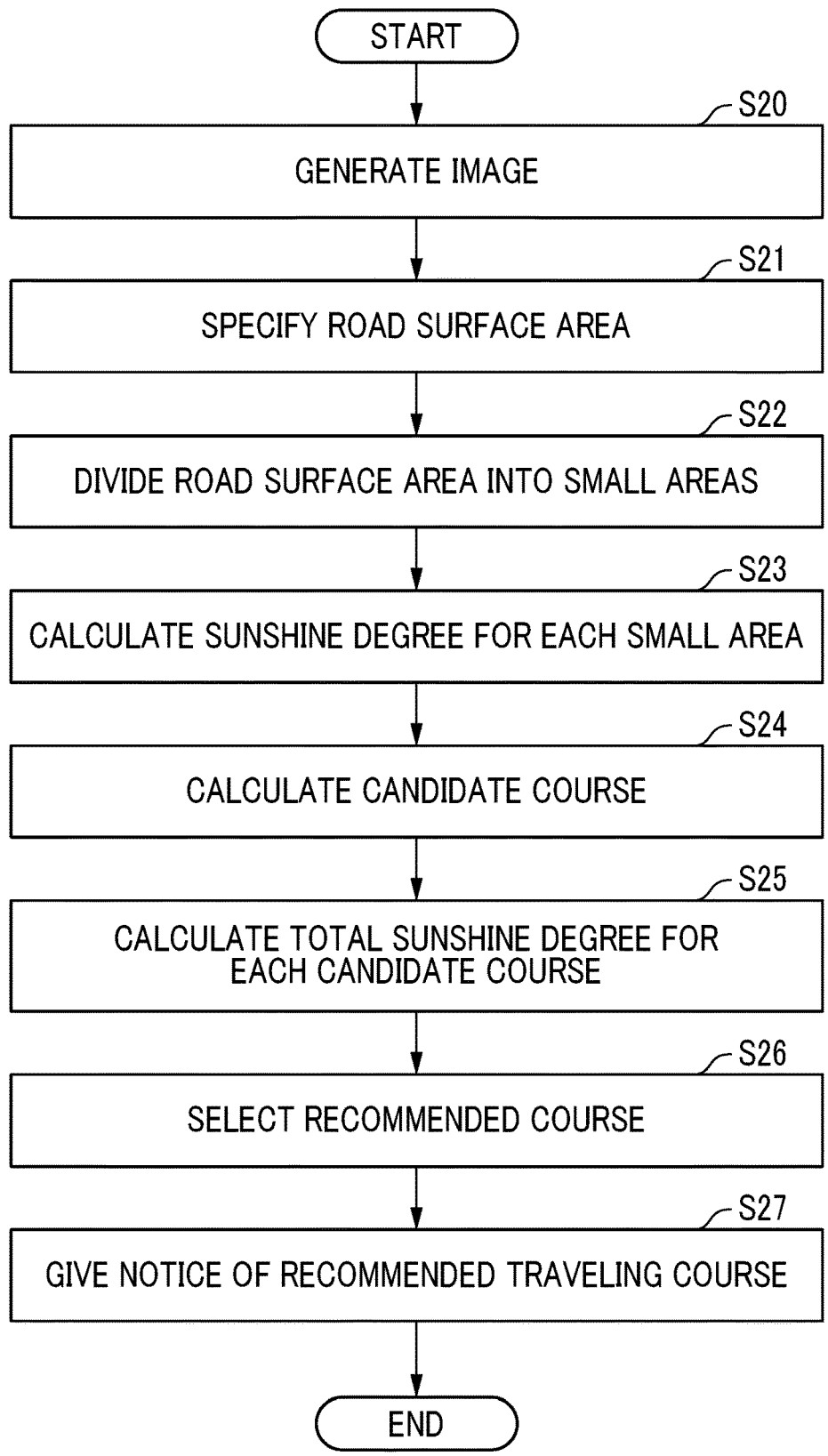
FIG. 6 is a diagram showing an example of an operation flow of recommended course notification processing of the small vehicle according to the embodiment of the disclosure.

FIG. 6 is a diagram showing an example of an operation flow of recommended course notification processing of the small vehicle 100 according to the embodiment of the disclosure. The recommended course notification processing is a processing of calculating and giving notice of at least one course that is recommended in one path, as described in detail below. The operation flow shown below may be repeatedly executed with a predetermined period, for example, while the small vehicle 100 is traveling in one path.

(Step S20)

Figure 7:
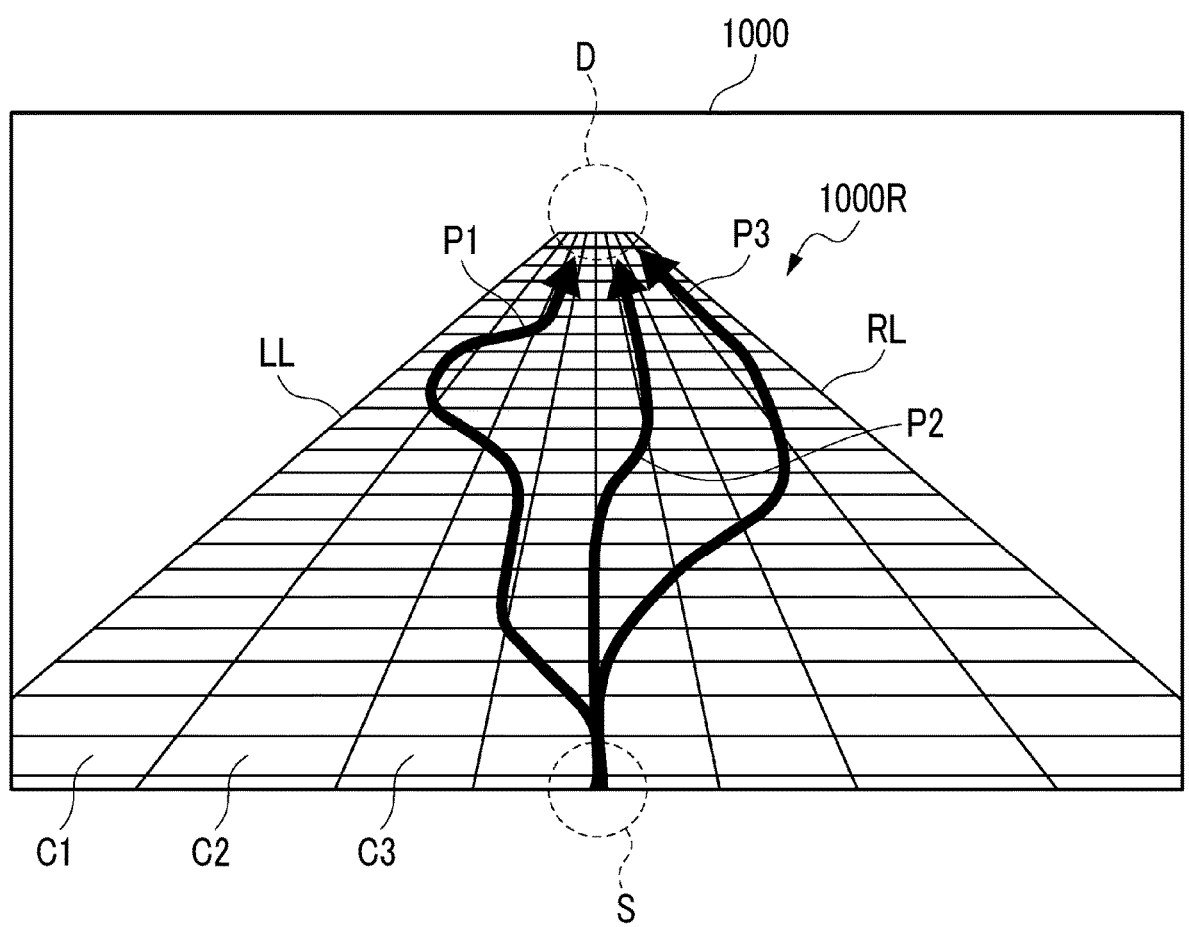
FIG. 7 is a diagram for describing calculation processing of a recommended course by the small vehicle according to the embodiment of the disclosure.

First, the camera 13 generates an image by executing imaging, based on a control signal that is supplied from the control device 9. In this way, an image 1000 that includes a road surface, as shown in, for example, FIG. 7, is generated.

(Step S21)

Next, the road surface area specifying unit 931 of the control device 9 specifies a road surface area that is included in the image 1000. The road surface area specifying unit 931 may specify the road surface area by any method. For example, a method may be used in which a luminance gradient (the amount of change in luminance information) to an adjacent image is calculated from luminance information of each pixel of the image 1000, a portion where the gradient takes a maximum value or a value equal to or larger than a predetermined threshold value is calculated as a feature point, and then, a right side and a left side of the road surface are selected from the feature point. The road surface area specifying unit 931 may specify a road surface area by a method using any feature amount such as a scale invariant feature transform (SIFT) feature amount or a speeded up robust features (SURF) feature amount, in addition to the above method. In FIG. 7, a trapezoidal portion denoted by symbol 1000R shows the road surface area. Further, symbol RL indicates the right side, and symbol LL indicates the left side.

(Step S22)

Next, the road surface area division unit 932 divides the road surface area into a plurality of small areas. For example, the road surface area division unit 932 divides the road surface area 1000R into small areas C1, C2, C3 and the like, as shown in FIG. 7. The shape or dimensions of the small area is not particularly limited.

(Step S23)

Next, the sunshine degree calculation unit 933 calculates a sunshine degree with respect to each of the small areas. Here, the "sunshine degree" is an amount indicating the degree to which a target area is illuminated with light (including not only natural light such as sunlight but also artificial light such as illumination), and includes so-called "illuminance". However, there is no limitation thereto, and it may include a parameter or the like calculated randomly based on luminance information or the like of an image. A method of calculating the sunshine degree may be based on, for example, luminance information of pixels that are included in the small area. For example, a total value, an average value, a median value, or the like of the luminances of pixels that are included in a certain small area may be adopted as the sunshine degree. Alternatively, the maximum value or the minimum value among the luminances of the pixels that are included in the small area may be adopted as the sunshine degree.

(Step S24)

Next, the candidate course calculation unit 941 calculates at least one candidate course connecting a current point to a destination point that is included in the image. In FIG. 7, the current point is indicated by symbol S and the destination point is indicated by symbol D. The current point S may be in the vicinity of the center of the lower side of the image 1000. Further, the destination point D may be a point at which the right side RL and the left side LL has approached each other within a predetermined distance. Alternatively, the destination point D may be a predetermined point in the image 1000, which is determined based on a separately calculated traveling course. Further, in FIG. 7, each of arrows indicated by symbols P1, P2, P3 indicates a candidate course. The candidate course calculation unit 941 may calculate, for example, the whole or a part of the course with the shortest path length, among the courses connecting the current point S to the destination point D, as a candidate course, and may calculate the whole or a part of the course with a path length less than a predetermined threshold value, as a candidate course.

(Step S25)

Next, the total sunshine degree calculation unit 942 calculates a total sunshine degree with respect to each of the candidate courses. Here, the "total sunshine degree" is a value that is obtained by summing the sunshine degrees of all the small areas through which the candidate course passes.

(Step S26)

Next, the recommended course selection unit 943 selects a recommended course from the candidate courses, based on the total sunshine degree. The recommended course selection unit 943 may select, for example, a course with the smallest total sunshine degree among the candidate course, or a plurality of courses with a total sunshine degree less than a predetermined threshold value, as a recommended course.

(Step S27)

Next, the recommended course notification unit 95 gives notice of the selected recommended course through the notification device 10. At this time, a sound indicating the position of the recommended course may be output so as to guide the rider to the recommended course, or the recommended course may be displayed on the display. With the above, the operation flow of the small vehicle 100 is ended.

The small vehicle 100 may have an autonomous driving mode, and in the case of the autonomous driving mode, the control device 9 may control the movement of the small vehicle 100 so as to travel along a recommended course.

As described above, with the small vehicle 100 according to the embodiment of the disclosure, the recommended course is calculated and notified based on the image generated by the imaging unit, and therefore, it becomes possible to reflect the actual sunshine situation of the road surface. Further, it becomes possible to evaluate the sunshine degree in a course unit finer than a road unit. Accordingly, it becomes possible to move away from sunlight, and therefore, the comfort at the time of a movement is improved.

In the embodiment described above, each of the recommended path and the recommended course is calculated by the small vehicle 100. However, at least one of the recommended path or the recommended course may be calculated by an information processing device such as a server device to which the small vehicle 100 is connected through a communication network, and thereafter, information on the path or the course may be transmitted to the small vehicle 100 such that notice is given in the small vehicle 100.

The embodiments described above are for facilitating the understanding of the disclosure and are not for construing the disclosure to a limited extent. The respective elements included in the embodiments and the disposition, materials, conditions, shapes, sizes, and the like of the elements are not limited to those illustrated, and can be appropriately changed. Further, the configurations shown in different embodiments can be partially substituted or combined with each other.

What is claimed is:

1. A moving body, which a person boards, the moving body comprising:
an acquisition unit configured to acquire current position information of the moving body;
a recommended path calculation unit configured to calculate a path to be followed by the moving body with the person on-board the moving body toward a predetermined destination based on the current position information and the predetermined destination, a portion of the path passing entirely through an interior of at least one building that is not the predetermined destination on the way to the predetermined destination;

an imaging unit configured to generate an image by imaging a road surface that is not the portion of the path that passes entirely through the interior of at least one building;

a sunshine degree distribution calculation unit configured to calculate a sunshine degree distribution of the road surface, based on the image;

a recommended course calculation unit configured to calculate a recommended course in which traveling is recommended within a portion of the path that includes the road surface, based on the sunshine degree distribution; and a recommended course notification unit configured to give notice of the recommended course, wherein the moving body is an inverted moving body vehicle.

2. The moving body according to claim 1, wherein the sunshine degree distribution calculation unit includes:

a road surface area specifying unit configured to specify a road surface area included in the image;

a road surface area division unit configured to divide the road surface area into a plurality of small areas that are smaller than the road surface area; and a sunshine degree calculation unit configured to calculate a sunshine degree with respect to each of the small areas.

3. The moving body according to claim 2, wherein the recommended course calculation unit includes:

a candidate course calculation unit configured to calculate at least one candidate course connecting a current point to a destination point included in the image;

a total sunshine degree calculation unit configured to calculate a total sunshine degree that is a total of the sunshine degrees of the small areas through which the candidate course passes, with respect to each of the at least one candidate course; and a recommended course selection unit configured to select the recommended course from the at least one candidate course, based on the total sunshine degree.

4. A moving body, which a person boards, the moving body comprising:

an imaging device configured to generate an image by imaging a road surface; and circuitry configured to:

acquire position information of the moving body, calculate a path to be followed by the moving body with the person on-board the moving body toward a destination of the moving body based on the position information of the moving body and the destination of the moving body, a portion of the path passing entirely through an interior of at least one building that is not the destination of the moving body on the way to the destination of the moving body, output the path, calculate a sunshine degree distribution of the road surface that is not the portion of the path that passes entirely through the interior of at least one building, based on the image, calculate a recommended course in which travelling is recommended within a portion of the path that includes the road surface, based on the sunshine degree distribution, and output the recommended course, wherein the moving body is an inverted moving body vehicle.

5. The moving body according to claim 4, wherein the circuitry is further configured to specify a road surface area that is included in the image, divide the road surface area into a plurality of small areas that are smaller than the road surface area, and calculate a sunshine degree with respect to each of the small areas.

6. The moving body according to claim 5, wherein the circuitry is further configured to calculate at least one candidate path connecting a current point to a destination point included in the image, calculate a total sunshine degree that is a total of the sunshine degrees of the small areas through which the candidate path passes, with respect to each of the at least one candidate path, and select a recommended path from the at least one candidate path, based on the total sunshine degree.

* * * * *